US008387142B2

(12) United States Patent
Christofferson et al.

(10) Patent No.: US 8,387,142 B2
(45) Date of Patent: Feb. 26, 2013

(54) SYSTEM AND METHOD FOR RADIO FREQUENCY INTRUSION DETECTION (75) Inventors: Bruce Christofferson, Camano Island, WA (US); Michael Demblewski, Celebration, FL (US)

(73) Assignee: AT&T Mobility II LLC, Atlanta, GA (US)

( * ) Notice: Subject to any disclaimer, the term of this patent is extended or adjusted under 35 U.S.C. 154(b) by 811 days.

(21) Appl. No.: 12/196,046

(22) Filed: Aug. 21, 2008

(65) Prior Publication Data
US 2010/0050259 A1  Feb. 25, 2010

(51) Int. Cl.
G06F 11/00 (2006.01)
G06F 12/14 (2006.01)
G06F 12/16 (2006.01)
G08B 23/00 (2006.01)

(52) U.S. Cl. .......................... 726/23; 380/350
(58) Field of Classification Search .............. 726/23
See application file for complete search history.

(56) References Cited

U.S. PATENT DOCUMENTS 3,794,992 A * 2/1974 Gehman ................ 342/28
7,590,991 B2 * 9/2009 Arad et al. ................ 725/15
2007/0152818 A1 * 7/2007 Sato ...................... 340/552
2008/0047011 A1 * 2/2008 Asati et al. ................ 726/23
2008/0102797 A1 * 5/2008 Coleman et al. .......... 455/411
2008/0107090 A1 * 5/2008 Thomson et al. .......... 370/338

OTHER PUBLICATIONS

Jeyanthi Hall, Radio Frequency Fingerprinting for Intrusion Detection in Wireless Networks; Jul. 2005; IEEE; pp. 1-35.*

* cited by examiner

Primary Examiner — Mohammad W Reza
Assistant Examiner — Monjour Rahim
(74) Attorney, Agent, or Firm — Moazzam & Associates, LLC (57) ABSTRACT A system to detect and analyze RF signals utilizes a data structure storing RF signatures indicating characteristics of known authorized and/or unauthorized RF transmissions. When an RF signal is detected, certain analysis characteristics are extracted from the RF signal and analyzed with respect to the stored RF signatures to determine whether the RF transmission is authorized or unauthorized. In the event of an unauthorized RF transmission, the system generates an alarm condition to alert the user to an RF intrusion and may further log data related to the intruder transmission. Known techniques may be used to determine the location of the RF intrusion within a defined area of operations.

14 Claims, 5 Drawing Sheets

SYSTEM AND METHOD FOR RADIO FREQUENCY INTRUSION DETECTION

BACKGROUND OF THE INVENTION

1. Field of the Invention

The present invention is directed generally to radio frequency monitoring and, more particularly, to a system and method for radio frequency intrusion detection.

2. Description of the Related Art

The problem of radio transmission security has existed almost since the invention of the radio. In one aspect, security involves the prevention of the interception and decoding of radio transmissions. However, in another aspect of radio security, it is desirable to detect and/or prevent unauthorized radio transmissions.

For example, an organization, such as the government, may wish to prevent unauthorized radio transmissions from a secure location, such as a military base, laboratory, a prison, or the like. One technique used to prevent unauthorized radio transmissions is to design a secure room that has shielding to prevent any radio transmissions. A technology known as Telecommunications Electronics Material Protected from Emanating Spurious Transmissions (TEMPEST) utilizes materials with special shielding properties. Passive systems such as TEMPEST protection are prohibitively expensive and are not technologically feasible for a large area, such as a military base or a prison.

Another alternative approach is to construct a Faraday cage around the secure room. Radio frequency signals are applied to coils that comprise the Faraday cage and block any radio frequency transmissions emanating from within the cage. Aside from the health issues associated with such an active Emissions Security (EMSEC) technology, the cost is significant. In addition, a Faraday cage is not technologically feasible for an area larger than a single room. In particular, Faraday cage technology would not work in a large compound, such as a military base, a prison, or the like.

Therefore, it can be appreciated that there is a significant need for a system and method to detect radio frequency intrusion within a secure area. The present invention provides this, and other advantages as will be apparent from the following detailed description and accompanying figures.

DETAILED DESCRIPTION OF THE INVENTION

The present description is directed to techniques to detect and identify radio frequency (RF) transmissions within a predefined area. The detected RF transmissions may be identified as authorized or unauthorized based on a signature analysis process.

Figure 1:
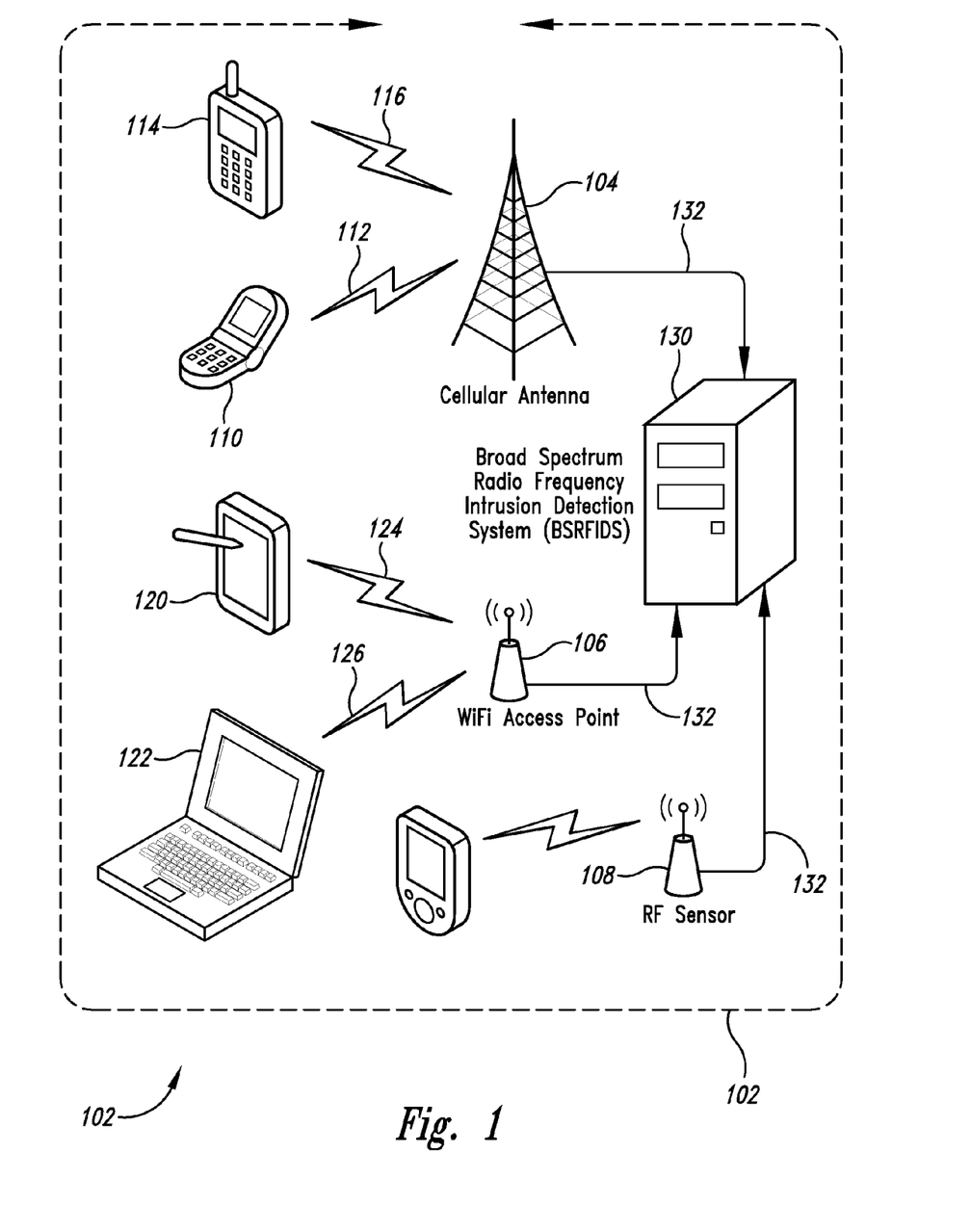
FIG. 1 illustrates a communication system constructed in accordance with the present teachings.

FIG. 1 illustrates an example embodiment of a system 100 designed in accordance with the present teachings. The system 100 is intended to detect RF intrusions within a consumer premise indicated by a dashed line 102 in FIG. 1. In the example embodiment of FIG. 1, the system include 100 one or more cellular antennas 104, one or more WiFi access points 106, and RF sensors 108 dispersed at various locations within the consumer premise 102.

The cellular antenna 104 may be part of an actual operating cellular system, or merely a passive detection system to detect RF transmissions in the cellular bands. In the embodiment illustrated in FIG. 1, the cellular antennae 104 communicates with a cell phone 110 via a communication link 112 and may also communicate with a personal communication system (PCS) 114 or other wireless communication device via a communication link 116. The operation of a cellular system utilizing the cellular antenna 104 (either in an active bi-directional or one-way listen-only mode) is well known in the art and need not be described in greater detail herein. However, as will be described in greater detail below, the cellular antenna 104 detects RF transmissions from the cell phone 110 and/or the PCS device 114. Those transmissions are analyzed in a manner described below to determine whether they are authorized or unauthorized transmissions.

The WiFi access point 106 may also be a normal bi-directional communication link for wireless devices, such as a personal digital assistant (PDA) 120 or a wireless computer 122. The PDA 120 communicates with the WiFi access point 106 via a communication link 124 while the wireless computer 122 communicates with the WiFi access point 106 via a communication link 126. The operation of the WiFi access point 106 to communicate with wireless devices (e.g., the wireless computer 122) is well known in the art and need not be described in greater detail herein. However, as will be described in greater detail below, the WiFi access point 106 detects the RF transmissions from the wireless devices. The detected RF transmissions are analyzed to determine whether they are authorized or unauthorized transmissions.

Although the WiFi access point 106 may operate as a conventional bi-directional communication access point, the WiFi access point 106 may also be implemented in a one-way listen-only mode. In this mode, the WiFi access point simply monitors predetermined frequency bands for RF transmissions. These passively detected RF transmissions are analyzed to determine whether they are authorized or unauthorized transmissions.

In addition to conventional communication devices, such as those described above, other licensed or unlicensed devices may be used by individuals to generate unauthorized RF transmissions. For example, FM or Citizens' Band (CB) radios, baby monitors, wireless medical equipment, Bluetooth devices, and the like may be utilized to generate RF transmissions. The system 100 may passively detect these transmissions with the RF sensor 108. In the embodiment illustrated in FIG. 1, one or more RF sensors 108 are passive devices that are simply designed to detect RF transmissions. The RF transmissions detected by the various components (e.g. the cellular antenna 104, WiFi access point 106, and RF sensor 108) are delivered to an analyzer 130, which analyzes the detected RF signals to determine whether they are authorized or unauthorized. As will be described in greater detail below, the analyzer 130 matches the detected RF signals with a stored RF signature to determine whether any particular RF transmission is an authorized or unauthorized transmission.

The RF signals detected by the cellular antenna 104, the WiFi access point 106, and the RF sensor 108 are delivered to the analyzer 130 via network links 132. Those skilled in the art will appreciate that the network links 132 may be implemented in any conventional manner using, by way of example, a hardwired network connection, fiber optic, wireless connection, or the like. The system 100 is not limited by the particular form of the network link 132.

Figure 2:
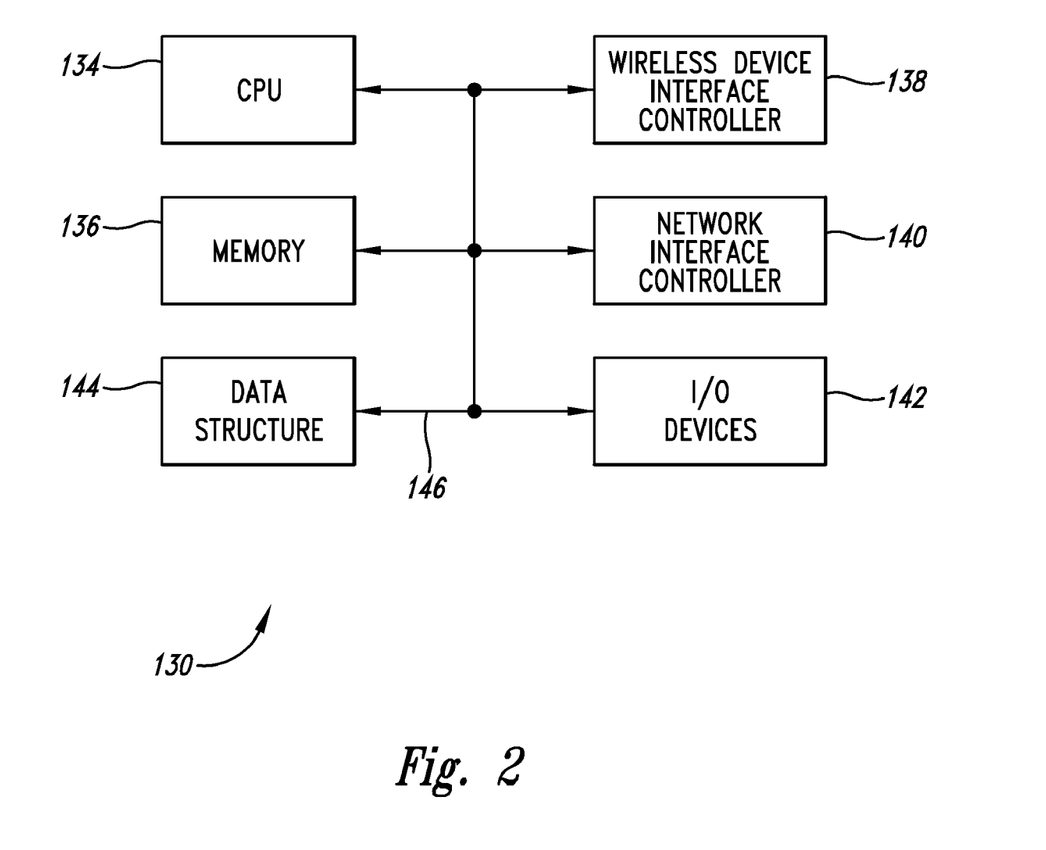
FIG. 2 is a functional block diagram of the intrusion detection system of FIG. 1.

FIG. 2 is a functional block diagram illustrating the analyzer 130. The analyzer 130 may be implemented using a conventional RF spectrum analyzer operating in conjunction with, and controlled by, a conventional computer. The functional components of the analyzer 130 may now be described.

The analyzer 130 includes a CPU 134 and a memory 136. In general, the memory 136 stores data and instructions that control operation of the CPU 134. The CPU 134 may be implemented using a variety of known technologies. For example, the CPU 134 may be a conventional microprocessor, a microcontroller, a digital signal processor (DSP), a programmable gate array (PGA), or the like. The system 100 is not limited by the specific form of device used to implement the CPU 134.

Similarly, the memory 136 may be implemented using a variety of known technologies. The memory 136 may include random access memory (RAM), read-only memory, flash memory, programmable memory, or the like. In one embodiment, a portion of the memory 136 may be integrated into a device with the CPU 134. The system 100 is not limited by the specific form of components used to implement the memory 136.

The analyzer 130 also includes a wireless device interface controller 138 to control communications between the analyzer 130 and the various monitoring devices, such as the cellular antenna 104, WiFi access point 106, and RF sensor 108. The wireless device interface controller 138 operates in a conventional manner and need not be described in greater detail herein.

The analyzer 130 may also include a network interface controller (NIC) 140. This permits the analyzer 130 to communicate with other computing devices coupled together on a local area network (not shown) or on a wide area network (not shown). The NIC 140 operates in a conventional manner and need not be described in greater detail herein.

The analyzer 130 also includes a number of I/O devices 142, such as a disk drive, keyboard, cursor controller, video display, audio output, and the like. These are conventional components whose operation is well known. For the sake of clarity and brevity, the various devices are illustrated in the functional block diagram of FIG. 2 simply as the I/O devices 142.

The analyzer 130 also includes a data structure 144. As will be described in greater detail below, the data structure 144 stores RF signature data used for analysis of the detected RF signals. Although the data structure 144 is illustrated as a separate functional block in the functional block diagram of FIG. 2, those skilled in the art will appreciate the data structure 144 would typically be implemented as a portion of the memory or other data storage device, such a disk drive. The data structure 144 may be implemented as a database, table, or any other convenient data storage structure. The system 100 is not limited by the specific form in which the data structure 144 is implemented. As will be described in detail below, the data structure 144 stores RF signatures that are used for analysis.

The various components illustrated in the functional block diagram of FIG. 2 are coupled together by a bus system 146. The bus system 146 may comprise an address bus, data bus, control bus, power bus, and the like. For the sake of convenience, the various busses are illustrated in FIG. 2 as the bus system 146.

The operation of the analyzer 130 and its use of the data structure 144 may now be described in greater detail. In one embodiment, the data structure 144 may store a series of RF signatures corresponding to authorized uses. That is, the system 100 collects RF signatures that are designated as transmissions from authorized devices and stores those RF signatures in the data structure 144. At a later time, an unknown RF signal is detected and is compared against known authorized RF signatures in the data structure to determine whether the newly-detected RF signal is a transmission is an authorized transmission.

In an alternative embodiment, the system 100 may also create RF signatures determined to be unauthorized devices. When an unknown RF signal is detected, it can be compared against the stored RF signatures in the data structure 144 designated as unauthorized RF signals.

In yet another alternative embodiment, the data structure 144 RF signatures from both authorized users and unauthorized users.

Figure 3:
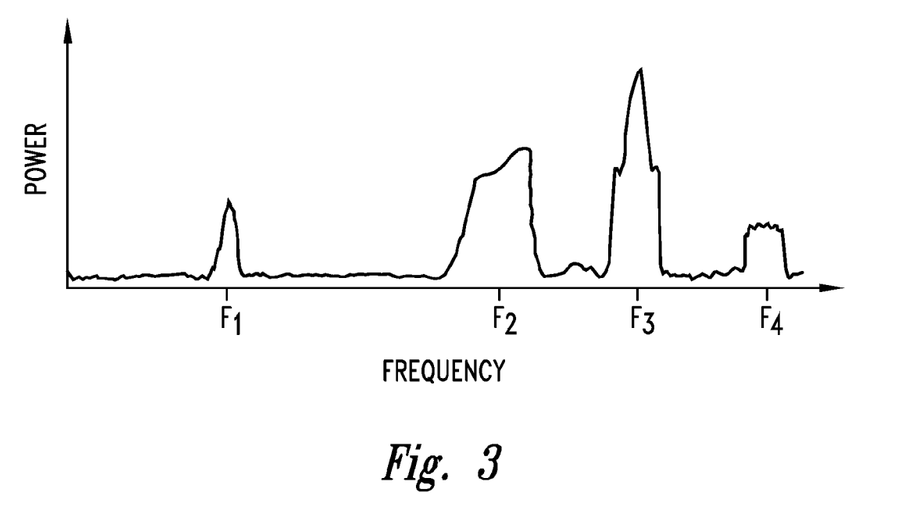
FIG. 3 is a sample radio frequency signal used by the system of FIG. 1.

FIG. 3 is a sample spectrum of RF signals detected by the system 100. In this example illustration, the system 100 is detected signals corresponding to four separate frequency bands. For example, the RF signal detected at frequency $F_1$ could correspond to detected radio signals in the 800 MHz band corresponding to advanced mobile phone system frequencies used by cellular telephones. In yet another example, the energy detected at frequency $F_2$ may correspond to RF signals in the PCS band at 1900 MHz. The RF signals at frequency $F_3$ and frequency $F_4$ may correspond to other licensed commercial or unlicensed transmissions, such as military equipment. These examples are illustrative only and are not intended as any limitation on the system 100.

In a particular consumer premise environment, it may be known, for example, that no devices are authorized to operate in the 800 MHz band. In this example, the RF signal detected at frequency $F_1$ in FIG. 3 corresponds to an unauthorized transmission.

In another example, the RF signal at frequency $F_2$ in FIG. 3 may correspond to an authorized transmission. Thus, the RF signature at frequency $F_1$ may be stored as an RF signature corresponding to an unauthorized transmission while the RF signature in the region at frequency $F_2$ could be stored as a separate RF signature corresponding to an authorized transmission.

Those skilled in the art will appreciate that other analytical tools may be used to determine whether an unknown transmission is authorized or unauthorized. For example, certain frequencies, such as the example of the RF signal at frequency $F_2$, may be within the expected frequency band, but may still be a transmission by an unauthorized user. The system 100 may look at additional characteristics, such as signal strength, bandwidth, shape of the spectral envelope, or the like as a means of comparing a detected RF signal with an RF signature stored in the data structure 144 (see FIG. 2).

The analysis and comparison process may be satisfactorily implemented by a number of different known techniques. For example, as discussed above, the analyzer 130 may simply look at the frequency bands in which transmissions occur. Other more detailed forms of analysis, such as a correlation analysis between the detected RF signal and a stored RF signature may also be performed. In one embodiment, the analyzer 130 may simply look at the presence or absence of a signal at a particular frequency. However, the analyzer 130 may also perform more detailed analysis of signals used to form the RF signatures and may use similar characteristics in the comparison between the detected RF signal and one or more of the stored RF signatures in the data structure 144. For example, the analyzer 130 may power measurements (peak power and/or average power), center frequency, bandwidth, shape of the spectral envelope (e.g., spectral roll-off) and the like. These forms of comparison and analysis are well known in the art and need not be described in greater detail herein.

Furthermore, the operation of the analyzer 130 is not limited by any specific form of comparison between the detected RF signal and the stored RF signature. The analyzer 130 makes a decision that the detected RF signal corresponds to an authorized transmission or to an unauthorized transmission and generates an appropriate output signal. An alert signal may be generated to indicate to a system operator that an RF intrusion has been detected by the system 100.

In addition, it may be possible to make a determination as to the location of the intruder RF transmission using known techniques. For example, triangulation, signal power detection and correlation among multiple sensors, and other known techniques may be used to generate information as to the location of the unauthorized transmitter.

Figure 4:
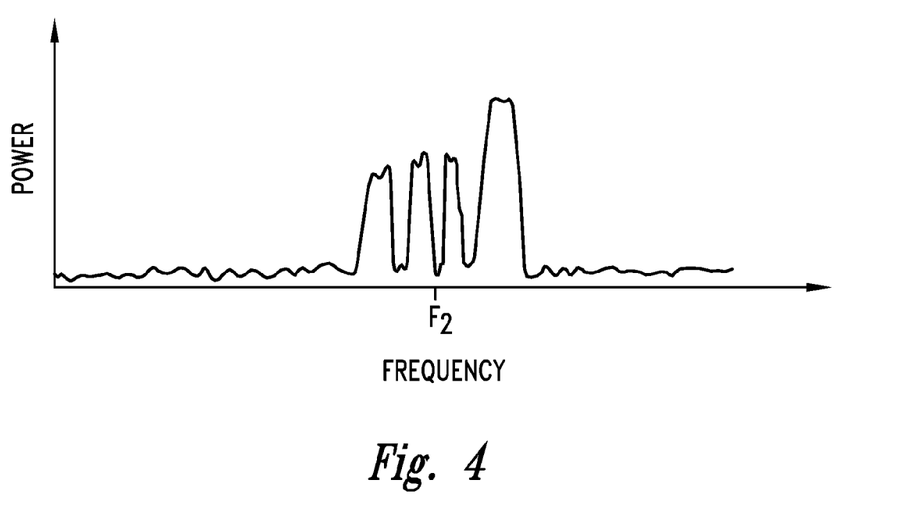
FIG. 4 is a sample radio frequency signal used by the system of FIG. 1.

FIG. 4 is another spectral diagram illustrating an expanded frequency scale around the frequency $F_2$. A single spectral envelope at the frequency scale of FIG. 3 actually has multiple individual peaks that are individually resolved with the expanded frequency scale of FIG. 4. The RF signature corresponding to an authorized transmission may have a certain spectral characteristic, such as that illustrated in FIG. 4. The spectral characteristics of a detected RF signal may be compared at this expanded scale to the RF signature to determine whether there is a suitable match such that the detected RF signal may be designated as an authorized transmission. If there is a suitable degree of match between the detected RF signal and one of the RF signatures stored in the data structure at 144 (see FIG. 2), a signal may be generated to indicate that the detected RF signal is from an authorized transmission. Conversely, if there is not an acceptable match between the detected RF signal and any of the RF signatures corresponding to authorized transmissions, the detected RF signal may be designated as an unauthorized transmission even though it appears generally to occur in the same frequency band as authorized transmissions. An alert signal may be generated to notify the user of the system 100 that an RF intrusion has been detected. Again, those skilled in the art will appreciate that a number of different characteristics, such as power (peak power and/or average power), bandwidth, spectral envelope, and the like can be form the original RF signature stored in the data structure 144 and may be subsequently used to analyze or compare a detected RF signal with the stored RF signature.

In some cases, certain known authorized RF signatures may be pre-stored in the data structure 144 (see FIG. 2). Similarly, certain RF signatures corresponding to unauthorized transmitters may also be predetermined and pre-stored in the data structure 144. However, in a typical implementation, the system 100 may be installed at the consumer premise location and placed in a "learn" mode. In the learn mode, the system 100 monitors all RF transmissions and dynamically develops a set of RF signatures for storage within the data structure 144. Those skilled in the art will appreciate that during the learn mode, it will be necessary to ensure that unauthorized transmissions do not occur so that they are not inadvertently designated as authorized transmissions.

Figure 5:
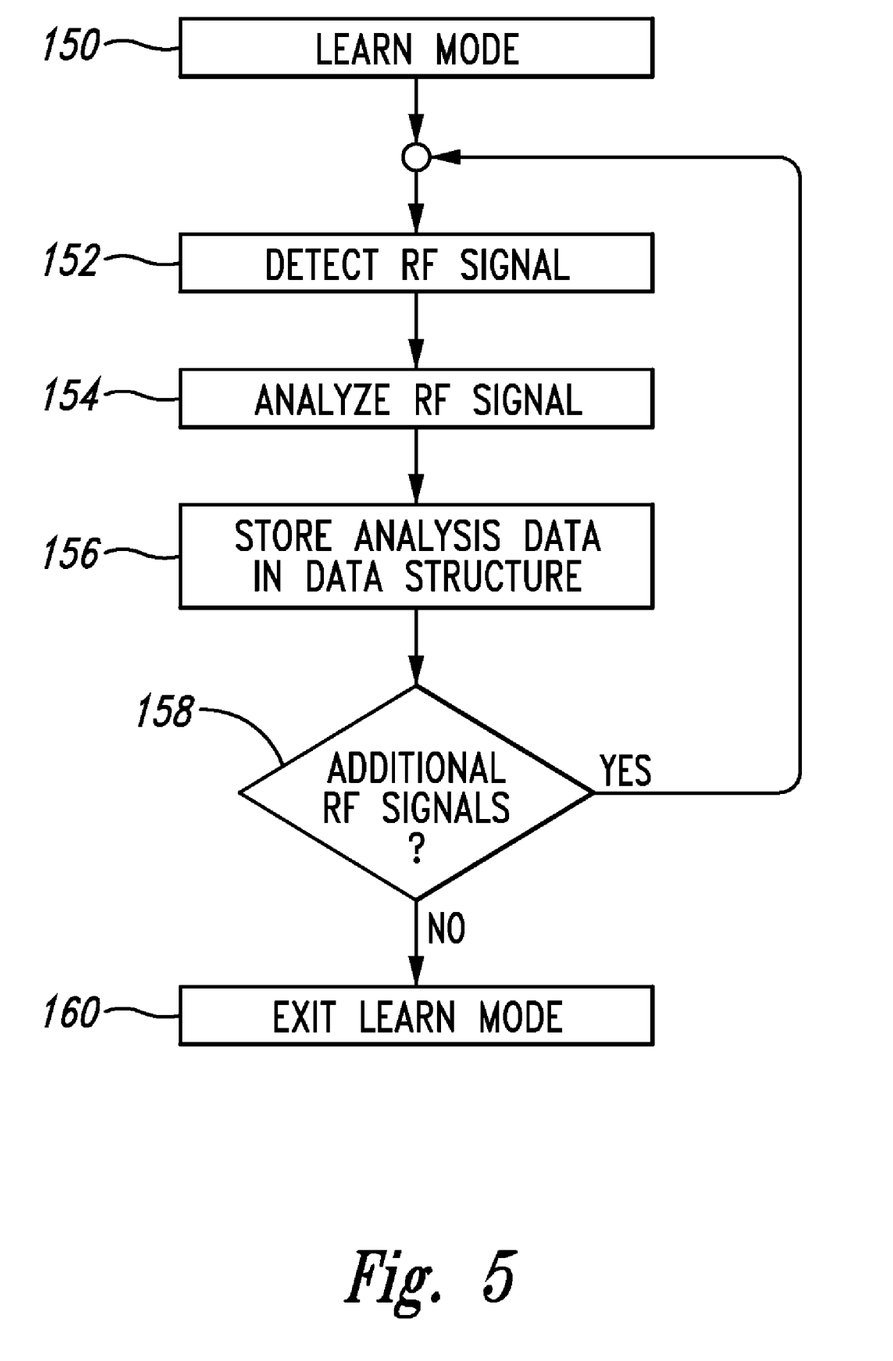
FIG. 5 is a sample flow chart illustrating the operation of the system of FIG. 1 in a learn mode.

FIG. 5 is a flow chart illustrating the operation of the system 100 in a learn mode 150. At step 150, the system 100 has been installed at the consumer premise location and the various antennas located in the proper positions. That is, the cellular antennae 104 and associated RF equipment may be positioned in a desired location. The precise positioning of the cellular antenna 104, one or more WiFi access points 106 and one or more RF sensors 108 are determined based on the size of the consumer premise 102 (see FIG. 1) as well as the location of blocking structures, such as buildings. The precise determination of locations for the cellular antennae 104, WiFi access point 106, and RF sensor 108 is within the knowledge of one ordinary skill in the art.

Once the various components have been installed, the system 100 may be placed in the learn mode. At step 152, the system detects an RF signal and, in step 154, the system 100 analyzes the detected RF signal. As previously discussed, the analysis may take a number of forms known in the art, including spectral analysis with characteristics such as center frequency, bandwidth, peak power, average power, spectral envelope, and the like.

In step 156, the various characteristics generated by the analysis of the detected RF signal are stored in the data structure 144 (see FIG. 2) as an RF signature for an authorized transmission.

In decision 158, the system 100 determines whether additional RF signals are detected. If so, the result of decision 158 is YES. The system returns to step 152 to detect and analyze additional RF signals. If no additional RF signals are detected, the result of decision 158 is NO and the system exits the learn mode in step 160. In a typical setting, the system 100 may be placed in the learn mode for a predetermined period of time. The length of time may be based on the frequency with which authorized transmitter are used. For example, in an active environment, the learn mode may be a few hours. In another setting, the learn mode may be one or more days. Following the completion of the learn mode, the system 100 has stored RF signatures in the data structured 144 that may be used for subsequent evaluation of detected RF signals. The user may also edit RF signatures, if necessary, to eliminate any RF signatures detected during the learn mode that are ambiguous or are determined to be the result of unauthorized RF transmissions.

One advantage of implementing the learn mode at the consumer premises is that the customer may have customer-defined signature creation capability applicable to their particular circumstances. The system 100 automatically detects RF transmissions at the consumer premises while in the learn mode and can detect RF intrusion at the consumer premises while in the monitor mode.

Figure 6:
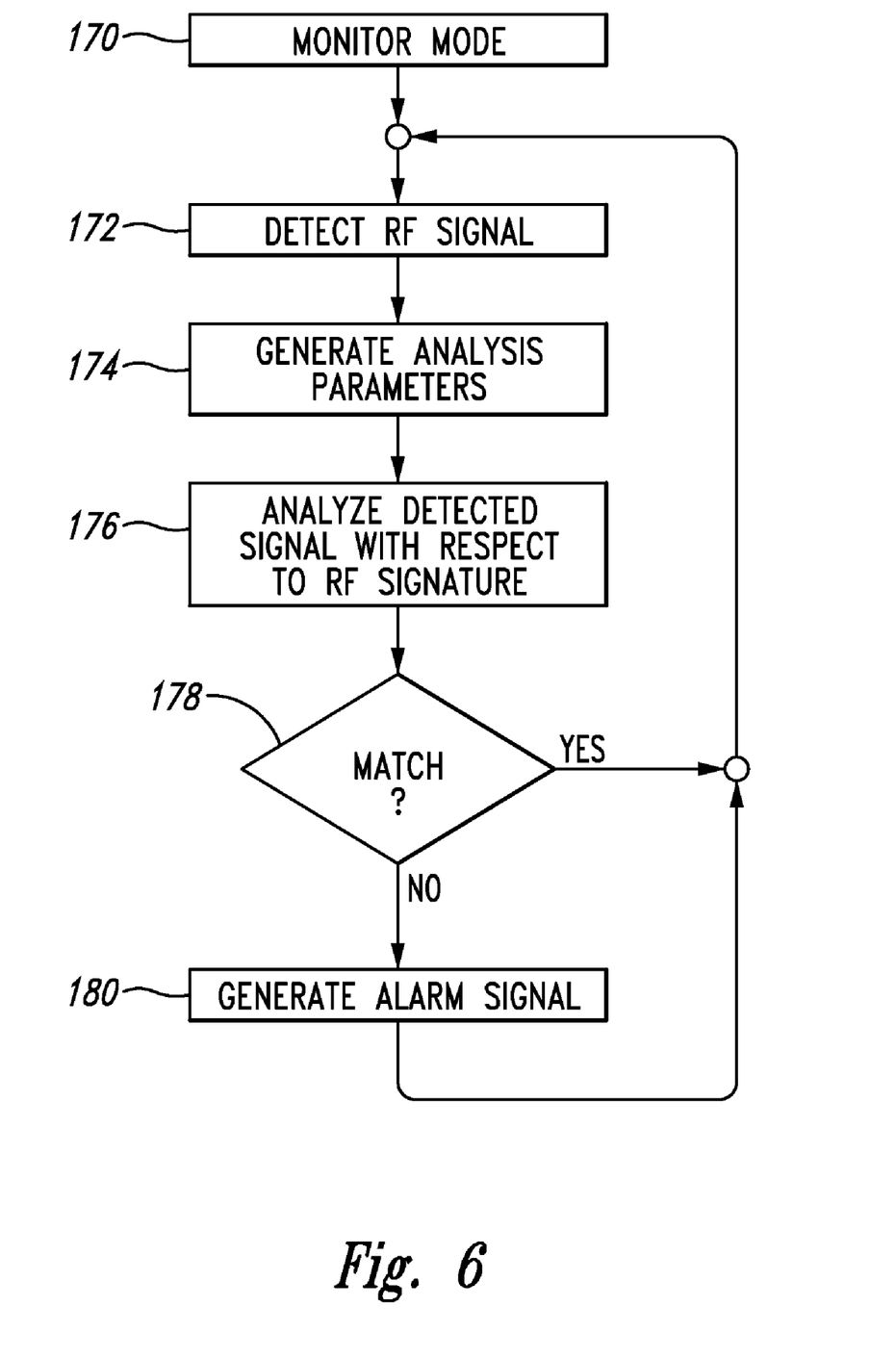
FIG. 6 is an example flow chart illustrating the operation of the system of FIG. 1 in a monitor mode.

Following completion of the learn mode, the system 100 may be placed in a "monitor" mode to detect RF signals and to compare those detected RF signals with RF signatures stored in the data structure at 144 (see FIG. 2). FIG. 6 illustrates an example flowchart depicting operation of the system 100 in a monitor mode 170. At step 172, the system 100 detects an RF signal. The detected RF signal is forwarded to the analyzer 130 via the network links 132 (see FIG. 1). In step 174, the analyzer 130 generates analysis parameters. As previously discussed, the particular parameters used for analysis may vary from one type of detected signal to another. However, the particular parameters, such as center frequency, spectral bandwidth, peak power, average power, and other characteristics are known in the art and may be utilized in the evaluation process by the analyzer 130.

In step 176, the analyzer 130 (see FIG. 1) analyzes the detected RF signal with respect to one or more stored RF signatures. Again, as noted above, the analysis may take any number of known forms.

In decision 178, the analyzer 130 determines whether there was a match between the detected signal and one or more of the stored RF signatures stored in the data structure 144 (see FIG. 2). If there is a match between the detected signal and one or more of the RF signatures, the result of decision 178 is YES and the system returns to step 172 to continue detecting and analyzing RF signals. If the result of the analysis is that there is no match between the detected RF signal and a stored RF signature, the result of decision 178 is NO. In that event, the system 100 generates an alarm signal in step 180 to notify the user that an RF intrusion has been detected. Following the generation of the alarm signal, the system 100 may return to step 172 to continue the monitoring process and the detection of additional RF signals. In addition to generating an alarm signal in step 180, the analyzer may send an alarm signal to another computing device on a network (not shown) using the NIC 140 (see FIG. 2).

In addition to generating an alarm, the analyzer may store data associated with the unauthorized transmission in a log within the memory 136 or on a data storage device, such a disk drive. In this manner, further detailed analysis of the RF intrusion may be performed. For example, the detected RF intrusion may be analyzed to develop a signature corresponding to an unauthorized user.

Those skilled in the art will appreciate that the flowchart of FIG. 6 illustrates operation of the analyzer 130 when comparing the detected RF signal to RF signatures in the data structure 144 that are designated as authorized transmissions. However, a similar operation can be implemented with respect to RF signatures in the data structure 144 that correspond to unauthorized transmissions. The sequence of FIG. 6 is identical up until the point where a match is determined. If the analyzer 130 is analyzing the detected RF signal with respect to RF signatures for unauthorized transmissions, a match will result in the generation of an alarm signal. If no match is detected, the analyzer 130 may return to step 172 to detect additional RF signals or may perform the additional analysis steps of analyzing the detected RF signal with respect to authorized RF signatures. Those skilled in the art will appreciate that other variations are also possible.

In an alternative embodiment, the cellular antenna 104 may be part of a fully functional cell phone system. Those skilled in the art will appreciate that a mobile station may typically detect signals from one or more base stations. The cell phone is designed to determine the best base station with which to communicate based on received signal strength. Cell phone service providers may sometimes force the mobile station to communicate with a less optimal base station that is operated by the service provider rather than a base station with a stronger signal that would result in the mobile station entering a "roam" mode.

In the embodiment illustrated in FIG. 1, the cellular antenna 104 and associated base station (not shown) may operate at a signal strength that makes it the most optimal base station with which a mobile station (e.g., the cell phone 110 or the PCS 114) will communicate. In this matter, the system 100 insures that all mobile stations will communicate with its base station associated with the cellular antenna 104. With such a restriction, it is possible to determine on the basis of identification data such as electronic serial numbers (ESN), mobile identification number (MIN), international mobile equipment identity (IMEI), or the like, whether the wireless device is an authorized device. An authorized transmission is processed in the normal fashion while and unauthorized transmission may be blocked. This alternative embodiment works with mobile stations using conventional cell phone or wireless technology, but is limited in its applicability to conventional cell phone devices. Other RF signature analysis techniques, such as those described above, can be used with cellular transmissions as well as other licensed or unlicensed devices.

Some systems may monitor for RF intrusions and only report RF intrusions that occur frequently or at least some minimum number of times. The system 100 is designed to quickly detect any RF transmission across a broad band of frequencies and to monitor those transmissions. If a transmission is determined to be an unauthorized transmission, its location can be determined in a manner described above. Thus, the system 100 is jot susceptible to intrusion that only occurs infrequently but can monitor at the first sign of intrusion.

The examples provided herein analyze RF signals provided to the analyzer 130 (see FIG. 1) by the various receivers. However, other signals, such as base band signals, could be provided to the analyzer 130. The present invention is not limited by the specific form of the signals provided for analysis.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A radio frequency (RF) intrusion detection system comprising:
 a plurality of RF receivers configured to detect an RF signal in a plurality of RF bands in a defined geographical area, each RF receiver including an RF antenna;
 a data structure configured to store a plurality of RF signatures within the defined geographical area; and
 a processor configured to
  generate an alarm signal indicative of an unauthorized RF transmission upon determining that the detected RF signal has no match among a plurality of stored authorized RF signatures;
 wherein each authorized RF signature from the plurality of stored authorized RF signatures includes a plurality of signal characteristics analyzed during a learn mode, the learn mode being a period of time during which RF signals are detected by at least one of the RF receivers.

2. The system of claim 1 wherein the detected RF signal is an authorized RF transmission when a match between the detected RF signal and the plurality of stored authorized RF signatures was determined as a result of the comparison.

3. The system of claim 1 wherein the RF signals and RF signatures include cellular band communications, WiFi communications, WiMAX communications, licensed consumer spectrum, and unlicensed consumer spectrum.

4. The system of claim 1 wherein one of the plurality of RF receivers is a WiFi access point.

5. The system of claim 1 wherein the data structure is configured to store unauthorized RF signatures and the processor is configured to
 compare the detected RF signal with at least a portion of the plurality of unauthorized RF signatures,
 determine a match between the detected RF signal and any of the portion of unauthorized RF signatures, and
 generate an alarm signal.

6. The system of claim 1 wherein the processor is further configured to determine a location of a transmitter generating an unauthorized RF transmission.

7. A method for radio frequency (RF) intrusion detection using a plurality of RF receivers positioned within a predetermined area to detect RF signals in a plurality of RF bands, each RF receiver having an associated RF antenna, the method comprising:
 generating an alarm signal indicative of an unauthorized RF transmission upon determining that a detected RF signal has no match among a plurality of authorized RF signatures stored in a data structure;
 wherein each authorized RF signature from the plurality of stored authorized RF signatures includes a plurality of signal characteristics analyzed during a learn mode, the learn mode being a period of time during which RF signals are detected by at least one of the RF receivers.

8. The method of claim 7 wherein the detected RF signal is an authorized RF transmission when a match between the detected RF signal and the plurality of stored authorized RF signatures was determined as a result of the comparison.

9. The method of claim 7 wherein the RF signals and RF signatures include cellular band communications, WiFi communications, WiMAX communications, licensed consumer spectrum, and unlicensed consumer spectrum.

10. The method of claim 7 wherein the learn mode is operational within the predetermined area.

11. The method of claim 7 wherein one of the plurality of RF receivers is a WiFi access point.

12. The method of claim 7 further comprising
 storing RF signatures correspond to unauthorized RF transmissions as a plurality of unauthorized signatures;
 comparing the detected RF signal with at least a portion of the plurality of unauthorized RF signatures;
 determine a match between the detected RF signal and any of the portion of unauthorized RF signatures;
 generate an alarm signal.

13. The method of claim 12, further comprising:
 analyzing the detected RF signal to generate an RF signature corresponding to the unauthorized RF transmission; and
 storing the generated RF signature corresponding to the unauthorized RF transmission.

14. The method of claim 7, further comprising determining a location of a transmitter transmitting an unauthorized RF transmission.

* * * * *